US 9,317,785 B1

(12) United States Patent
Moon et al.

(10) Patent No.: US 9,317,785 B1
(45) Date of Patent: Apr. 19, 2016

(54) METHOD AND SYSTEM FOR DETERMINING ETHNICITY CATEGORY OF FACIAL IMAGES BASED ON MULTI-LEVEL PRIMARY AND AUXILIARY CLASSIFIERS

(71) Applicants: Hankyu Moon, Oak Park, CA (US);
Rajeev Sharma, State College, PA (US);
Namsoon Jung, State College, PA (US);
Joonhwa Shin, State College, PA (US)

(72) Inventors: Hankyu Moon, Oak Park, CA (US);
Rajeev Sharma, State College, PA (US);
Namsoon Jung, State College, PA (US);
Joonhwa Shin, State College, PA (US)

(73) Assignee: Video Mining Corporation, State College, PA (US)

( * ) Notice: Subject to any disclaimer, the term of this patent is extended or adjusted under 35 U.S.C. 154(b) by 0 days.

(21) Appl. No.: 14/257,816

(22) Filed: Apr. 21, 2014

(51) Int. Cl.
*G06K 9/00* (2006.01)
*G06K 9/62* (2006.01)

(52) U.S. Cl.
CPC ..... *G06K 9/6267* (2013.01); *G06T 2207/30201* (2013.01)

(58) Field of Classification Search
None
See application file for complete search history.

(56) References Cited

U.S. PATENT DOCUMENTS

| 5,537,488 | A | 7/1996 | Menon et al. |
| 6,336,051 | B1 * | 1/2002 | Pangels et al. ................ 700/50 |
| 6,526,156 | B1 | 2/2003 | Black et al. |
| 6,973,201 | B1 | 12/2005 | Colmenarez et al. |
| 6,990,217 | B1 | 1/2006 | Moghaddam et al. |
| 7,236,615 | B2 | 6/2007 | Miller et al. |
| 7,848,548 | B1 | 12/2010 | Moon et al. |
| 7,912,246 | B1 * | 3/2011 | Moon et al. ................ 382/103 |
| 2002/0102024 | A1 | 8/2002 | Jones et al. |
| 2002/0159627 | A1 | 10/2002 | Schneiderman et al. |
| 2002/0169730 | A1 | 11/2002 | Lazaridis |
| 2003/0161500 | A1 | 8/2003 | Blake et al. |
| 2003/0210808 | A1 | 11/2003 | Chen et al. |
| 2005/0265581 | A1 | 12/2005 | Porter et al. |

OTHER PUBLICATIONS

Wu, "Improving SVM Accuracy by Training on Auxiliary Data Sources," 2004, Proceedings of the 21st International Conference on Machine Learning, pp. 1-8.*

(Continued)

*Primary Examiner* — David F Dunphy

(57) ABSTRACT

The present invention is a system and method for performing ethnicity classification based on the facial images of people, using multi-category decomposition architecture of classifiers, which include a set of predefined auxiliary classifiers that are specialized to auxiliary features of the facial images. In the multi-category decomposition architecture, which is a hybrid multi-classifier architecture specialized to ethnicity classification, the task of learning the concept of ethnicity against significant within-class variations, is handled by decomposing the set of facial images into auxiliary demographics classes; the ethnicity classification is performed by an array of classifiers where each classifier, called an auxiliary class machine, is specialized to the given auxiliary class. The facial image data is annotated to assign the age and gender labels as well as the ethnicity labels. Each auxiliary class machine is trained to output both the given auxiliary class membership likelihood and the ethnicity likelihoods. Faces are detected from the input image, individually tracked, and fed to all the auxiliary class machines to compute the desired auxiliary class membership and ethnicity likelihood outputs. The outputs from all the auxiliary class machines are combined in a manner to make a final decision on the ethnicity of the given face.

14 Claims, 16 Drawing Sheets

(56) References Cited

OTHER PUBLICATIONS

Sarawagi et al, "Crosstraining: Learning probabilistic mappings between topics," 2003, SIGKDD, pp. 1-10.*

Yin et al, "3D face recognition based on high-resolution 3D face modeling from frontal and profile views," 2003, WBMA, pp. 1-8.*

S. Gutta, et al., "Mixture of experts for classification of gender, ethnic origin, and pose of human faces," IEEE Transaction on Neural Networks, 11(4):948-960, 2000.

J. Choi, et al., "3d face reconstruction using a single or multiple views," 20th IEEE International Conference on Pattern Recognition (ICPR), 2010 (pp. 3959-3962).

* cited by examiner

| FACIAL IMAGES | ETHNICITY 860 | AUXILIARY CATEGORIES 665 ||
| --- | --- | --- | --- |
| | | GENDER | AGE |
| 👤 | ETHNICITY CLASS 1 | GENDER CLASS 1 | AGE CLASS 1 |
| 👤 | ETHNICITY CLASS 2 | GENDER CLASS 2 | AGE CLASS 2 |
| 👤 | ETHNICITY CLASS 2 | GENDER CLASS 1 | AGE CLASS 3 |
| 👤 | ETHNICITY CLASS 3 | GENDER CLASS 1 | AGE CLASS 1 |
| 👤 | ETHNICITY CLASS 2 | GENDER CLASS 2 | AGE CLASS 4 |
| 👤 | ETHNICITY CLASS 3 | GENDER CLASS 2 | AGE CLASS 1 |
| ⋮ | ⋮ | ⋮ | ⋮ |

Fig. 6

METHOD AND SYSTEM FOR DETERMINING ETHNICITY CATEGORY OF FACIAL IMAGES BASED ON MULTI-LEVEL PRIMARY AND AUXILIARY CLASSIFIERS

CROSS-REFERENCE TO RELATED APPLICATIONS

Federally Sponsored Research

Not Applicable

SEQUENCE LISTING OR PROGRAM

Not Applicable

BACKGROUND OF THE INVENTION

Field of the Invention

The present invention is a system and method for determining the ethnicity class of people based on their facial images, using multi-category decomposition architecture of classifiers based on multi-level primary and auxiliary classifiers and voting scheme in classifier fusion.

The method in the present invention is based on an observation about the facial image ensembles in the image pixel space: that there is a great degree of variability within each set of facial images having the same ethnic origin so that it is hard to recognize the ethnic category of a person using a traditional multi-class classification approach. Machine learning-based classification methods have been successfully applied to many classification problems when enough training examples are available.

These methods are based on estimating a mapping from the image space to the space of numerical values or to a discrete set of class labels, using the known relationship between the training images and the groundtruth target values. The mapping should therefore disregard all of the irrelevant variations of the image ensembles within the same class, such as lighting, pose, hairstyles, age, gender, etc. However, it is hard for a single learning machine or several machines (each classifies one category against other categories) to learn and represent image classes showing such wide variations.

Many complex classification problems can be handled using multi-classifier architectures. A parallel multi-classifier is one of such architectures; multiple specialized learning machines are trained where each machine is tuned to images from a specific class. The input data is processed by the set of classifiers in a parallel manner, and the final decision is made based on all of the responses from these specialized machines. Many multi-class classification problems are handled in the same way. Another kind is a serial multi-classifier architecture, where the first classifier performs a gross-level classification and the next classifiers perform finer-level classification. The series of classifications are applied in a serial manner. In the example of age classification, the first classifier can perform children versus non-children classification; the second classifier can perform adult versus senior classification on non-children, and so on.

The third kind of multi-classifier architecture is the hybrid multi-classifier architecture. The classification problem is broken down to multiple hybrid classifications where each classifier performs both the gross-level classification and the specialized classification. Each hybrid classifier is tuned to a specific gross-level class, and also performs finer-level classification which is specialized within the given gross-level class. However, the gross-level classifier does not have to make a hard decision, because it can just output the gross-level class membership likelihood. The same machine or a separate machine can deal with the finer-level classification for the instances from all of the gross-level classes, but is specialized to the given gross-level class. The specialization can be implemented by enforcing a more accurate finer-level classifier output for the instances from the given gross-level class. For example, in an age classification problem, one male hybrid classifier is tuned to male instances and one female hybrid classifier is tuned to female instances. Each classifier also performs age classification (for example, classifies into children, adults, seniors) for all possible data, but the male classifier is specialized to the age classification of male instances and the female classifier is specialized to the age classification of female instances. The final decision is made based on the output from all of the hybrid classifiers, by a classifier fusion scheme.

The present invention handles the ethnicity classification problem by introducing a multi-category decomposition architecture, which is an exemplary embodiment of the hybrid multi-classifier architecture, where the learning machines are structured and trained to represent the face ensembles grouped by appearance-based demographics categories. The aforementioned hardship for learning a high-level concept (such as demographics categories) is handled by decomposing the facial image space into subspaces, where each subspace represents a demographics category. The main idea is to group faces having similar appearances, and perform the task of classification within each group using a specialized hybrid classifier. Pixel appearance based clustering can also be considered; however, the pixel value based clustering does not usually yield meaningful clusters. The clusters reflect rather irrelevant features such as lighting or pose variation. The present invention makes use of auxiliary category information—the demographics categories that are not of given interest—to group the facial images. Ethnicity classification can greatly benefit from this scheme, due to the great degree of appearance variability within each ethnicity group. In the case of ethnicity classification, the gender and age are the auxiliary categories. A specialized hybrid learning machine is dedicated to each auxiliary class (gross-level classes: gender and age), and ethnicity classification is performed within the class. In one of the exemplary embodiments, the multi-category decomposition parameterize the gender and age variation using multiple learning machines; each learning machine is trained to respond to a specific (gender, age) class, and at the same time trained to classify the ethnicity within the (gender, age) class. The strength of the approach comes from the fact that each machine specializes in the ethnicity classification for the limited class of facial appearance (from the same age and gender). However, the system does not make a hard decision as to which auxiliary class each face belongs. Because there is uncertainty in the class membership, all of the auxiliary class learning machines contribute to the final decision where the scores are weighted by the likelihood of the given face belonging to the auxiliary class.

Virtually all of the demographics classification systems employ some kind of training based on the groundtruth demographics labels. In the present invention, annotating auxiliary demographics information does not add much extra effort, in addition to annotating ethnicity labels.

In the area of performing demographics classification based on facial images of people, U.S. Pat. No. 6,990,217 of Moghaddam, et al. (hereinafter Moghaddam) proposed to employ an SVM to find the optimal separating hyperplane in feature space to solve the gender recognition problem. This is a typical approach to solve the demographics recognition problem, by estimating the direct relation from the facial image to the demographics labels (such as male, female, etc). While the ethnicity classification problem can be solved in the same manner, a small number of SVMs may not effectively learn the concept of ethnicity, where there are significant within-class variations. The proposed invention solves the issue by partitioning the facial image space into meaningful groups based on the auxiliary demographics categories such as gender and age. In U.S. Pat. No. 7,848,548 of Moon, et al. (hereinafter Moon), a comprehensive approach to perform demographics classification from tracked facial images has been introduced. The method to carry out the demographics classification, including the ethnicity classification, also utilizes a conventional machine learning approach to find a mapping from the facial image data to the class labels. Moon put an emphasis on solving the nontrivial problem of pose for the demographics classification, while the present invention focuses on the problem of learning the demographics concept by decomposing the facial image space into auxiliary demographics classes. The present invention also utilizes a two-dimensional facial geometry and correction method similar to the method disclosed in Moon. In "Mixture of experts for classification of gender ethnic origin and pose of human faces," IEEE Transaction on Neural Networks, 11(4):948-960, 2000, by S. Gutta, et al. (hereinafter Gutta), methods to classify gender, ethnicity, and pose, using the ensembles of neural networks and decision trees, were introduced. While Gutta also uses multiple learning machines (RBF neural networks and decision trees) for the classification problems, they use multiple learning machines blindly with no regard to other demographics information. They cluster the face images using a k-means clustering algorithm based on facial appearance. However, the appearance (pixel values) based clustering does not usually yield meaningful clusters. The clusters may reflect rather arbitrary features such as lighting or pose variation. The present invention systematically uses meaningful auxiliary demographics information to group the facial images, effectively dividing the ethnicity classification into meaningful classes.

Regarding attempts for finding class information of data by utilizing another data attributes, the present invention employs an auxiliary class determination method similar to U.S. Pat. No. 5,537,488 of Menon, et al. (hereinafter Menon), simply utilizing the auxiliary class likelihood to weight the ethnicity outputs. U.S. Patent Appl. 20020169730 of Lazaridis, et al. (hereinafter Lazaridis) proposed approaches to identifying one or more latent classes among data by utilizing the class information or data attributes in another dimension. To extract more reliable ethnicity information, the present invention makes use of the auxiliary class information. The present invention shares its very broad framework with Lazaridis, but it proposes a novel approach to utilizing the fact that the ethnicity comparison is more meaningful within the same gender or age class. U.S. Patent Appl. 20030210808 of Chen, et al. (hereinafter Chen) introduced a facial image clustering method where the clustering is based on the similarity score from the face recognizer. The present invention utilizes the auxiliary class (membership) likelihood, to weight the ethnicity scores; however, the class clusters come from auxiliary demographics information rather than the appearance-based scores as in Chen. The present invention shares a fundamental idea with U.S. Pat. No. 7,236,615 of Miller, et al. (hereinafter Miller)—that of using auxiliary or latent information to improve classification. In Miller, however, the space of facial images are expanded by a convolutional neural network to face manifold parameterized by continuous pose parameter, which is assumed to be available, for the purpose of classifying faces from non-faces. In the present invention, the space is expanded using the auxiliary demographics information, which is a categorical parameter.

Regarding prior attempts for detecting human faces in still images or in videos, the disclosed method assumes that a stream of detected faces is fed to the system, where face detection is performed by utilizing a machine learning-based face detection method, similar to the method disclosed in U.S. Pat. Appl. Pub. No. 20020102024 of Jones, et al. (hereinafter Jones) and U.S. Pat. Appl. Pub. No. 20020159627 of Schneiderman, et al. (hereinafter Schneiderman).

In order to track a human face in video, the disclosed invention utilizes the facial appearance to keep the identity of people, as in U.S. Pat. No. 6,526,156 of Black, et al. (hereinafter Black), and U.S. Pat. Appl. Pub. No. 20030161500 of Blake, et al. (hereinafter Blake). However, the method does not require offline training or model building; the proposed invention builds online models of appearance. The inventions of U.S. Pat. No. 6,973,201 of Colmenarez, et al. (hereinafter Colmenarez) and U.S. Pat. Appl. Pub. No. 20050265581 of Porter, et al. (hereinafter Porter) are designed to track multiple faces and keep the person identity at the same time. The proposed invention, however, does not perform explicit tracking, which requires continuity of the tracks; it just makes correspondences between detected faces. Most of these tracking approaches will fail under low frame rates or severe occlusion, however, the proposed method is still able to track faces under these circumstances.

In summary, the present invention proposes a method to detect, track, and classify ethnicity of the facial images. It employs face detection, face tracking, and two-dimensional facial pose estimation in a manner similar to prior inventions, but has a novel way of dividing the ethnicity classification into meaningful auxiliary classes within which ethnicity classification is performed. While some of the prior inventions use a similar principle of decomposing the classification problem into multiple specialized classifications, each of these classifiers is specialized to appearance-based clusters. The present invention systematically uses auxiliary demographics information (such as gender and age) to group the facial images, and each specialized classification is performed within a meaningful demographics class. The classification results from multiple machines are fused using decision trees in the prior invention, while a probabilistically meaningful integration is used in the present invention.

SUMMARY

The present invention is a system and method for determining the ethnic classes of people based on their facial images using a multi-category decomposition architecture learning machine method.

It is one of the objectives of the first step of the processing to annotate the facial image dataset according to the facial appearance of each image in the dataset. Typically gender and age are annotated in addition to the ethnicity of each facial image. In an exemplary embodiment, the gender labels are (male, female) and the age labels can be (child, young adult, adult, and senior). The exemplary ethnicity labels can be {"ethnicity class 1", "ethnicity class 2", "ethnicity class 3", and "ethnicity class 4"}. The demographics categories of gender and age other than the category of interest (ethnicity) are called auxiliary categories. Other demographics categories based on complexions or body build types can also be considered as auxiliary categories.

It is one of the objectives of the second step of the processing to structure the set of learning machines so that each learning machine represents an auxiliary class. In concept, an array of learning machines represents the multi-dimensional structure of the facial image manifold, parameterized by the auxiliary categories. In an exemplary embodiment, the set of learning machines can be ((male, child), (female, child), (male, young adult), (female, young adult), (male, adult), (female, adult), (male, senior), (female, senior)).

It is one of the objectives of the third step of the processing to train the set of learning machines. Each learning machine is trained to output high response to every face from the given auxiliary class; for example, the (male, child) machine is trained to output 1.0 for the (male, child) faces while suppressing (output=0.0) the response to faces from other auxiliary classes. Each machine is also trained to output the ethnicity label of the given input face, where the auxiliary-class specialization of the ethnicity classification is enforced by coding the outputs of the given auxiliary class machine differently from all other auxiliary class machines.

It is one of the objectives of the fourth step of the processing to detect faces in an image frame, track the faces, and adjust their two-dimensional poses. The face detection step finds any human faces in a given image frame, localizes, and estimates sizes approximately so that a rectangle, whose position and size correspond to the facial image, can be drawn around the boundary of the face. The face tracking keeps identities of people by maintaining a queue of identified faces, and by updating the queues. The facial pose adjustment step estimates the two-dimensional or three-dimensional pose variations (position, size, and orientation) of the face, and applies an image transformation so that all of the faces have a standard position, size, and orientation.

In case of the three-dimensional pose variations including out-of-plane rotation of faces, the initial pose of the face can be estimated by using a shape model of face landmarks including the edges of eyes, mouth, and nose. A generic 3D face mesh model can then be initially aligned with the input face based on the estimated initial pose. The 3D face model alignment is further refined by an iterative distance minimization method. Given the best match between the input face and the aligned 3D face model, the deformation function is estimated based on the correspondence between a set of face landmarks between them. The 3D face model is then deformed and textures are mapped. The 3D face model with texture is normalized to produce an exact frontal-view for further processing.

It is one of the objectives of the fifth step of the processing to estimate the auxiliary class membership likelihood and then to classify the ethnicity of the tracked and two-continued dimensional adjusted face. The two-dimensional adjusted face is fed to the set of learning machines, and each learning machine outputs both the likelihood of the input face belonging to the given auxiliary class of the machine, and the ethnicity label. The set of learning machines output these quantities, and the final ethnicity label of the input face is determined by the average of the ethnicity outputs from all of the machines, weighted by the auxiliary class likelihood scores.

DRAWINGS

Figures

FIG. 6 shows the groundtruth demographics labeling scheme for the facial image annotation.

DETAILED DESCRIPTION OF THE INVENTION

Figure 1:
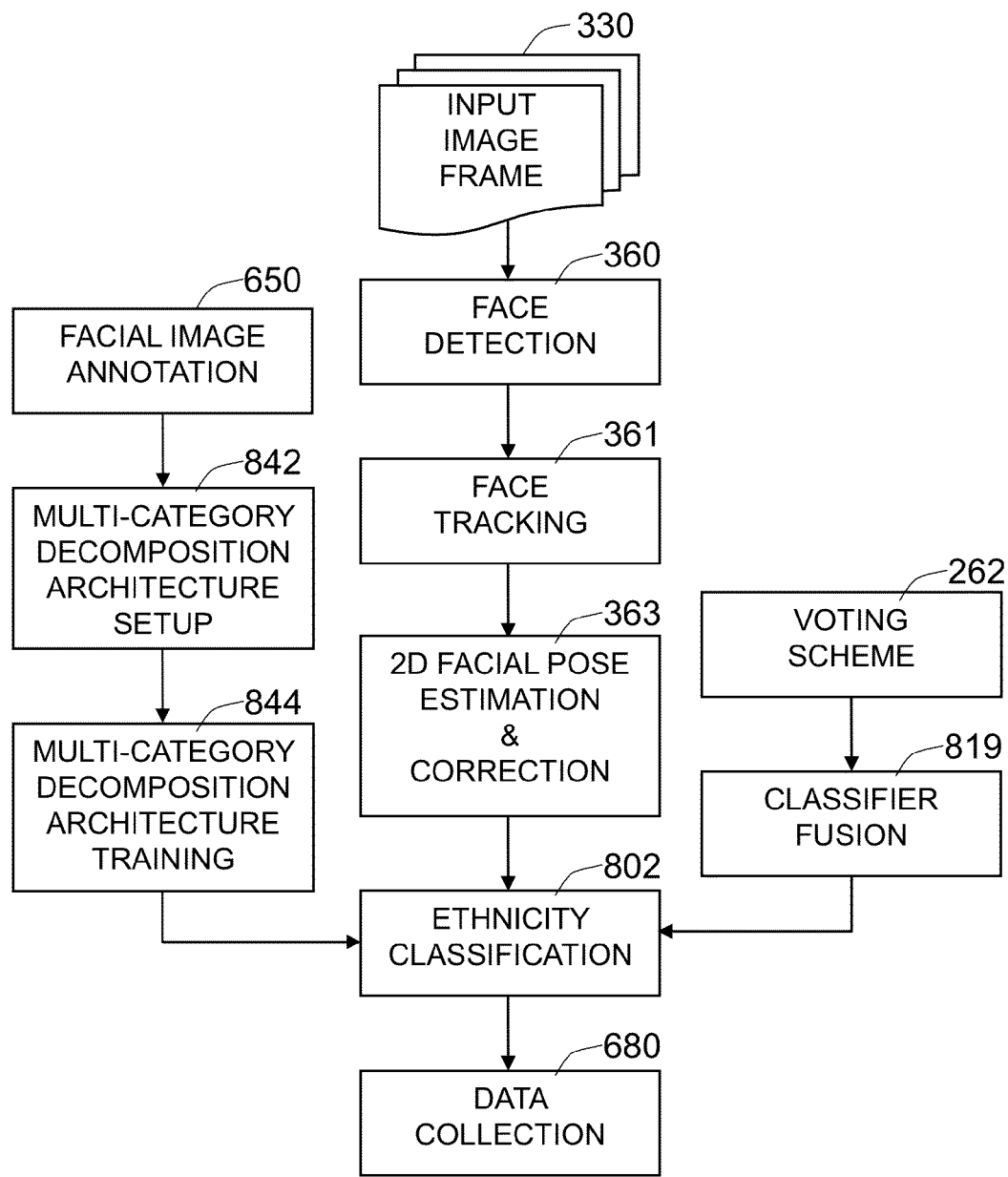
FIG. 1 is an overall view of the preferred embodiment of the invention.

A preferred embodiment of the present invention is illustrated in FIG. 1. It shows the overall view of the system; the facial image annotation 650 step manually assigns labels (gender, age, and ethnicity) to each of the facial images in the face database. The granularity of the labeling should be determined beforehand. In an exemplary embodiment, age can be labeled as child, adult, or senior. Age can also be labeled as 18 and below, from 18 to 30, from 30 to 44, from 45 to 60, or 60 and above. The next multi-category decomposition architecture setup 842 step prepares the learning machines corresponding to all of the (gender, age) classes. The multi-category decomposition architecture training 844 step trains all of the learning machines so that they generate the desired outputs for the set of input facial images. Once the training is done, the system is ready to process any facial image to determine its ethnicity. Given an input image frame 330, the face detection 360 step finds faces in the frame along with their approximate location and size. The face tracking 361 step then keeps the identities of individual faces by maintaining a queue of tracks. The two-dimensional facial pose estimation & correction 363 step normalizes the facial geometry to a standard position, size, and orientation. Then the ethnicity classification 802 step uses a trained array of ethnicity classification machines to determine the ethnicity of the normalized face. A voting scheme 262 can be applied to a series of classification instances that are estimated by the array of ethnicity classification machines to select the best result for the ethnicity classification among the multiple classification instances in the series during a classifier fusion 819 process. The data collection 680 step stores, displays or transmits the determined ethnicity labels.

Figure 2:
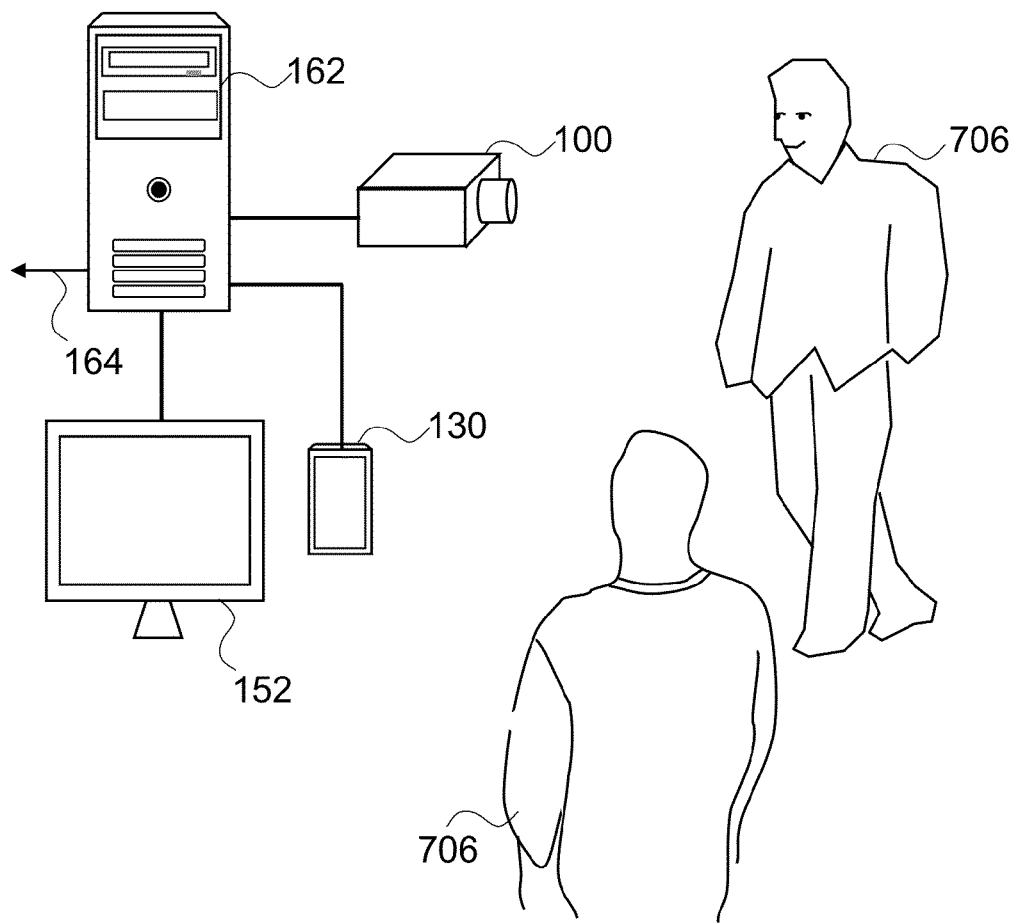
FIG. 2 is a view of the preferred embodiment of the invention in an operational environment.

FIG. 2 shows a view of the system of the invention in an exemplary embodiment in an operational environment. The means for capturing images 100 are connected to a control and processing system 162 via analog, USB, Firewire, ethernet, or wireless connections. The position, orientation, and the field-of-view of the means for capturing images 100 are determined to maximize the coverage of the target person 706. The means for capturing images 100 captures the facial images of the target person 706 and sends them to the control and processing system 162, which holds most of the processing and generates the data. The output data is stored to an internal or external storage 130, displayed using a visual display 152, or transmitted to a network using a network connection 164.

Figure 3:
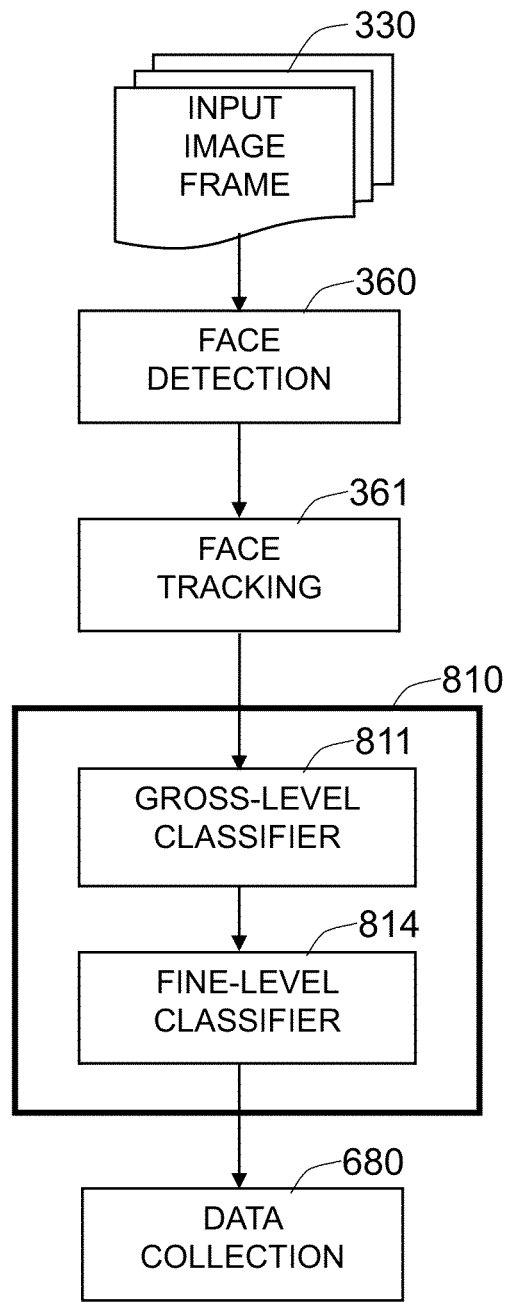
FIG. 3 is a view of a serial multi-classifier architecture.

FIG. 3 shows an overview of an exemplary embodiment of the serial multi-classifier 810 architecture designed for the task of ethnicity classification. From an input image frame 330, faces are detected by the face detection 360 step and tracked by the face tracking 361 step. The first gross-level classifier 811 performs a classification of the tracked facial images into broad classes and the next finer-level classifier 814 performs classification into subclasses of the broad classes. The plurality of classifications is applied in a serial manner. One example is first to classify gender and then classify the ethnicity only within the classified gender classes. In another example of age classification, the first classifier can perform child versus non-child classification; the second classifier can perform adult versus senior classification on non-child, and so on.

Figure 4:
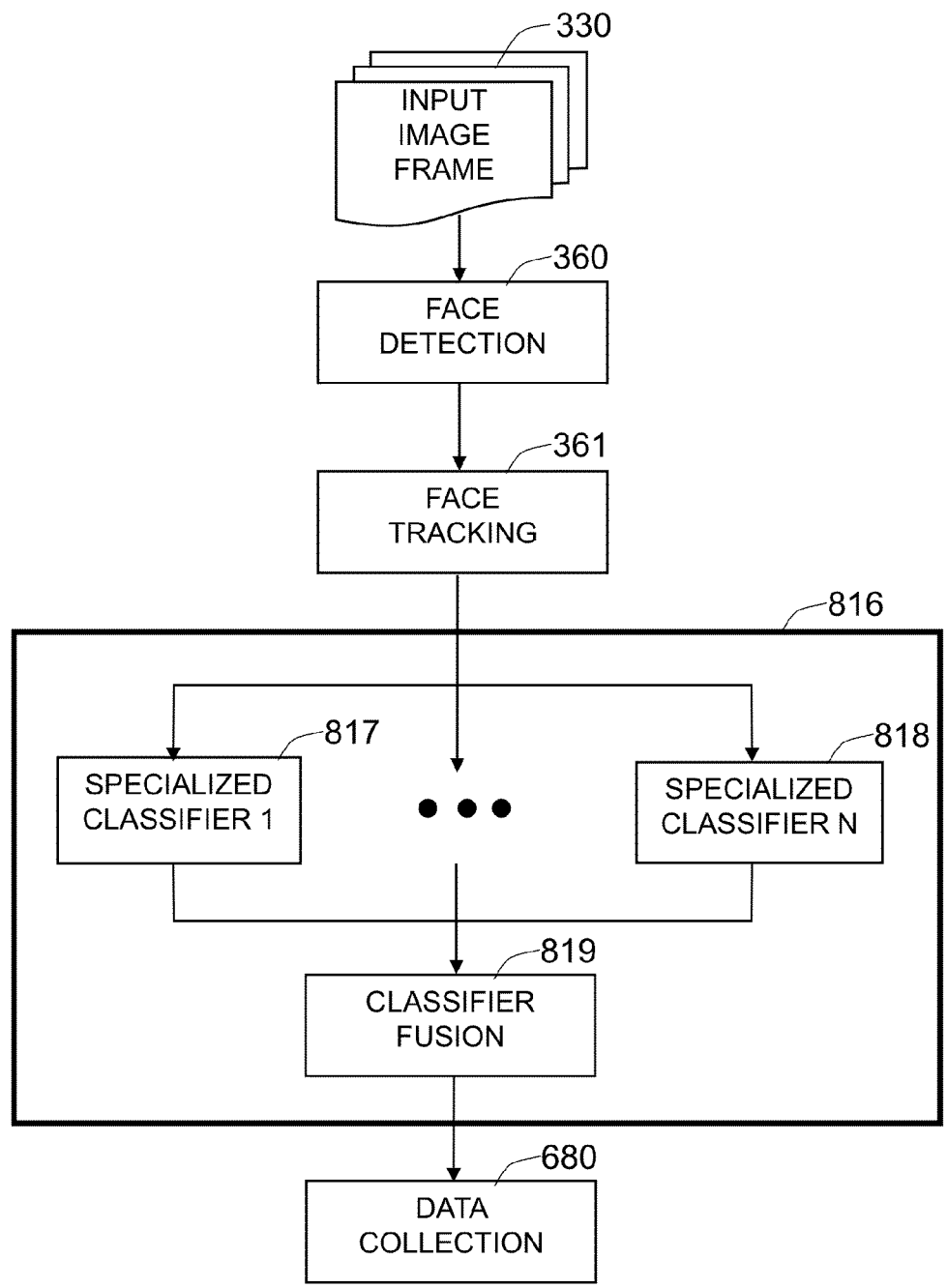
FIG. 4 is a view of a parallel multi-classifier architecture.

FIG. 4 shows an overview of an exemplary embodiment of the parallel multi-classifier 816 architecture. From an input image frame 330, faces are detected by the face detection 360 step and tracked by the face tracking 361 step. In the parallel multi-classifier architecture 816, multiple specialized classifiers, from a specialized classifier 1 817 to a specialized classifier N 818, are trained where each classifier is tuned to instances from a specific class. The traced facial image is processed by the set of trained classifiers in a parallel manner, and the final decision is made based on all of the responses from these specialized machines at the classifier fusion 819 step. Many multi-class classification problems are handled this way. In one of the exemplary embodiments, each specialized classifier is tuned to a demographics class that is delimited by both an ethnicity class and an auxiliary class. For example, the specialized classifier 1 817 is tuned to (male, "ethnicity class 1", child) class. The next classifier is tuned to (male, "ethnicity class 1", young adult), and so on. A voting scheme can be applied to a series of classification instances to select the best result for the ethnicity classification among the classification instances in the series.

Figure 5:
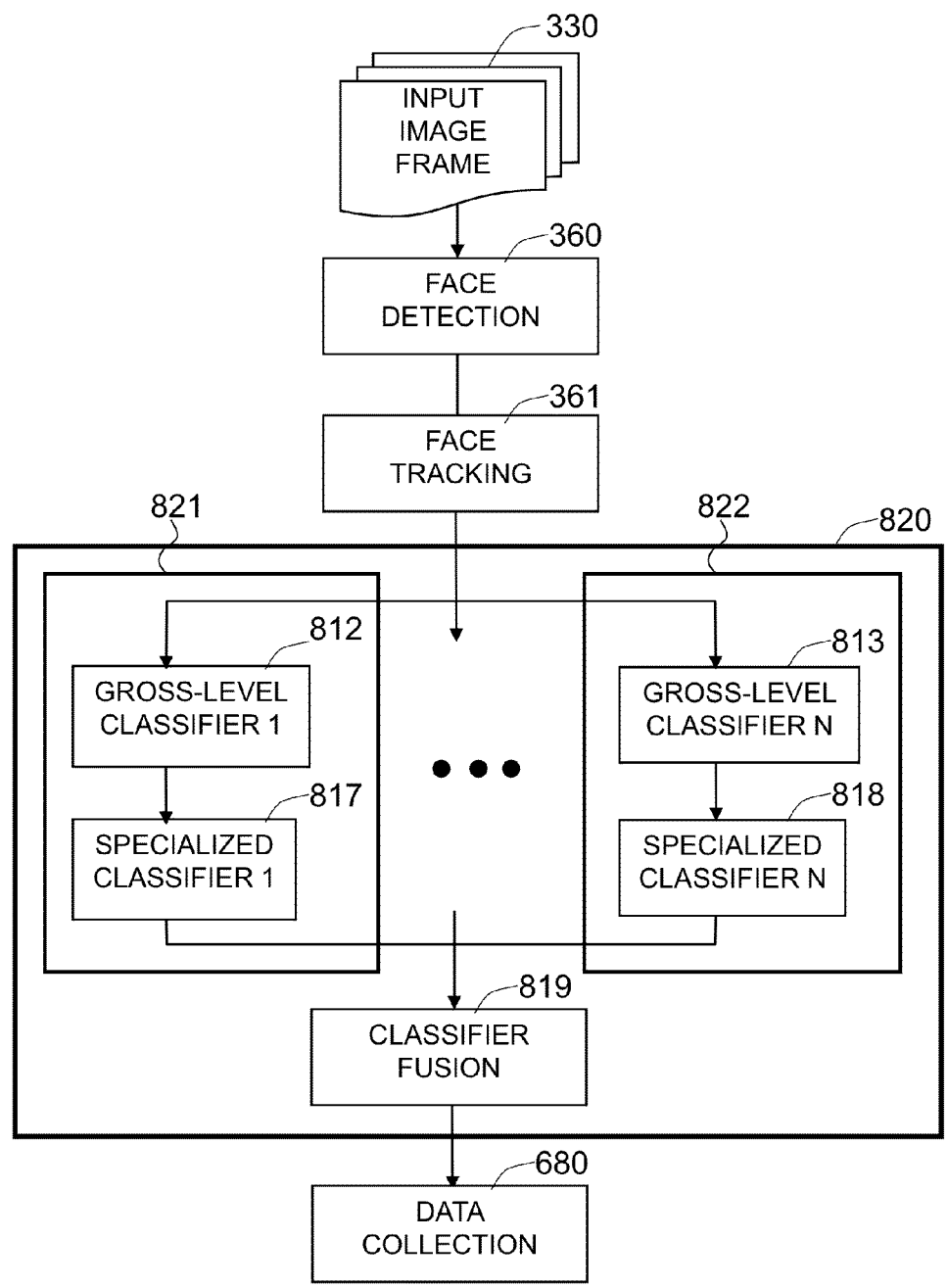
FIG. 5 is a view of a hybrid multi-classifier architecture.

FIG. 5 shows an overview of an exemplary embodiment of the hybrid multi-classifier 820 architecture. From an input image frame 330, faces are detected by the face detection 360 step and tracked by the face tracking 361 step. The ethnicity classification problem is distributed to multiple hybrid classifiers where each classifier, from a hybrid classifier 1 821 to a hybrid classifier N 822, performs both the gross-level classification and the specialized classification. The hybrid classifier 1 821 consists of the gross-level classifier 1 812 and the specialized classifier 1 817, and the hybrid classifier N 822 consists of the gross-level classifier N 813 and the specialized classifier N 818. Each hybrid classifier is tuned to a specific gross-level class and also performs a finer-level classification which is specialized to the given gross-level class. For example, in the hybrid classifier 1 821, the gross-level tuning is performed by the gross-level classifier 1 812, and the finer-level classification is performed by the specialized classifier 1 817. However, the gross-level classifier does not have to make a hard decision, because it can just output the gross-level class membership likelihood. The specialized classifiers deal with the finer-level classification for the instances from all of the gross-level classes, but are specialized to the given gross-level class. The final decision is made based on the output from all of the hybrid classifiers, by the classifier fusion 819 step.

FIG. 6 shows the groundtruth demographics labeling 654 scheme for the facial image annotation 650 in an exemplary embodiment of the present invention. First, the auxiliary demographics categories 665 should be determined. In the figure, gender and age are determined as auxiliary categories. In an exemplary embodiment, the gender category has (male, female) labels and the age category has (child, young adult, adult, senior) labels. The age category can also be more finely divided into a larger number of classes, such as {-9, 10-19, 20-29, 30-39, 40-49, 50-59, 60-69, 70-}. The ethnicity classes can be determined according to a given application; exemplary divisions can be {"ethnicity class 1", "ethnicity class 2", "ethnicity class 3", ... }. Human annotators typically view the facial images displayed on computer monitors and determine the demographics labels.

Figure 7:
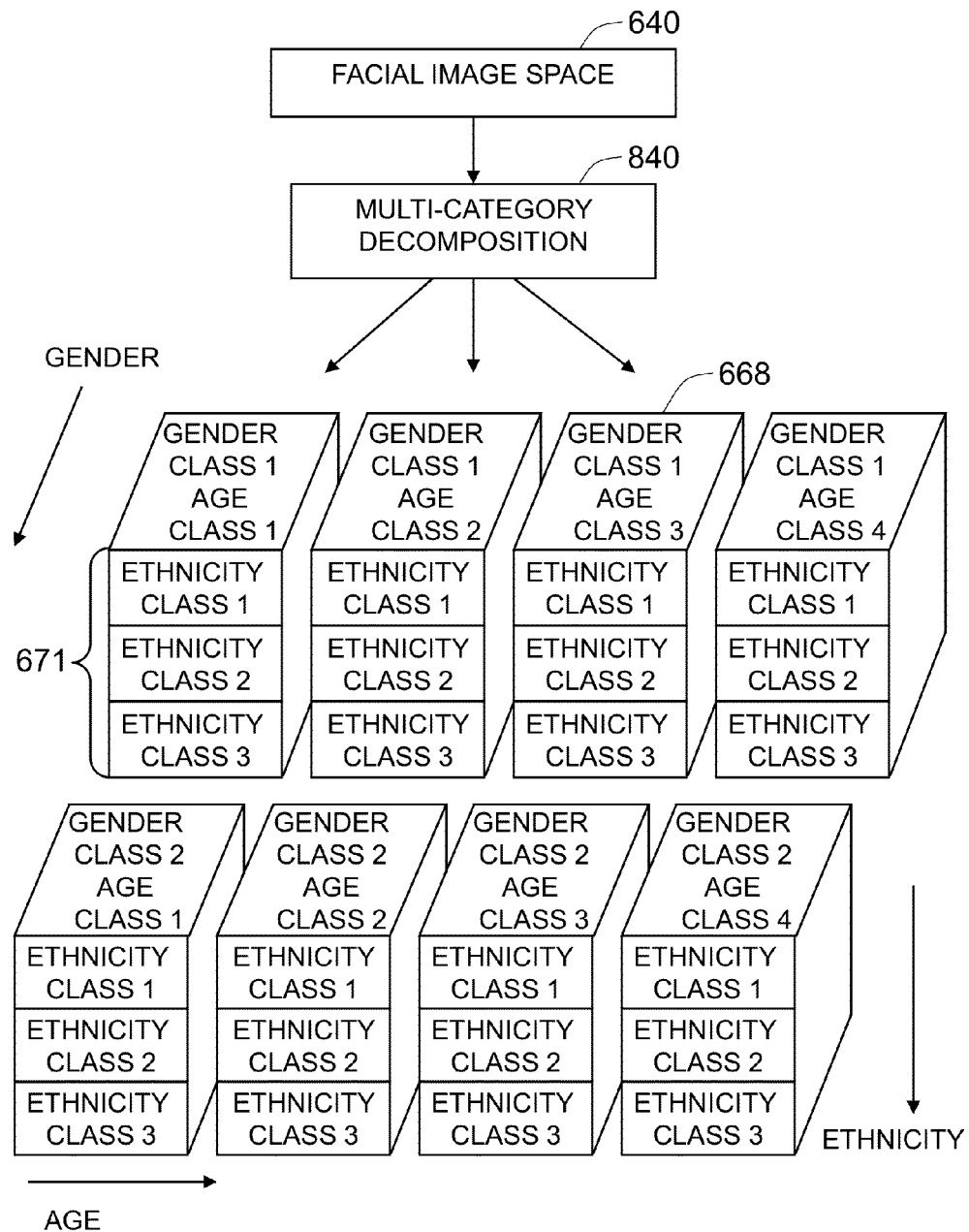
FIG. 7 shows the scheme of multi-category decomposition.

FIG. 7 shows an exemplary multi-category decomposition architecture 841. The multi-category decomposition architecture 841 is also an exemplary embodiment of the hybrid multi-classifier 820 architecture that was illustrated in FIG. 5. The whole facial image space 640 is partitioned into a plurality of auxiliary classes 668. In the exemplary embodiment, the auxiliary categories are two-dimensional, gender and age. Each auxiliary class has facial images having varied ethnicity classes 671: "ethnicity class 1", "ethnicity class 2", and "ethnicity class 3". Each auxiliary class 668 is represented by a hybrid classifier that is tuned to the facial images from the auxiliary class; the hybrid classifier is trained to classify the ethnicity of the facial images belonging to the auxiliary class 668. Within the hybrid classifier, the gross-level classifier and the specialized classifier can be implemented by separate learning machines or a single learning machine.

Figure 8:
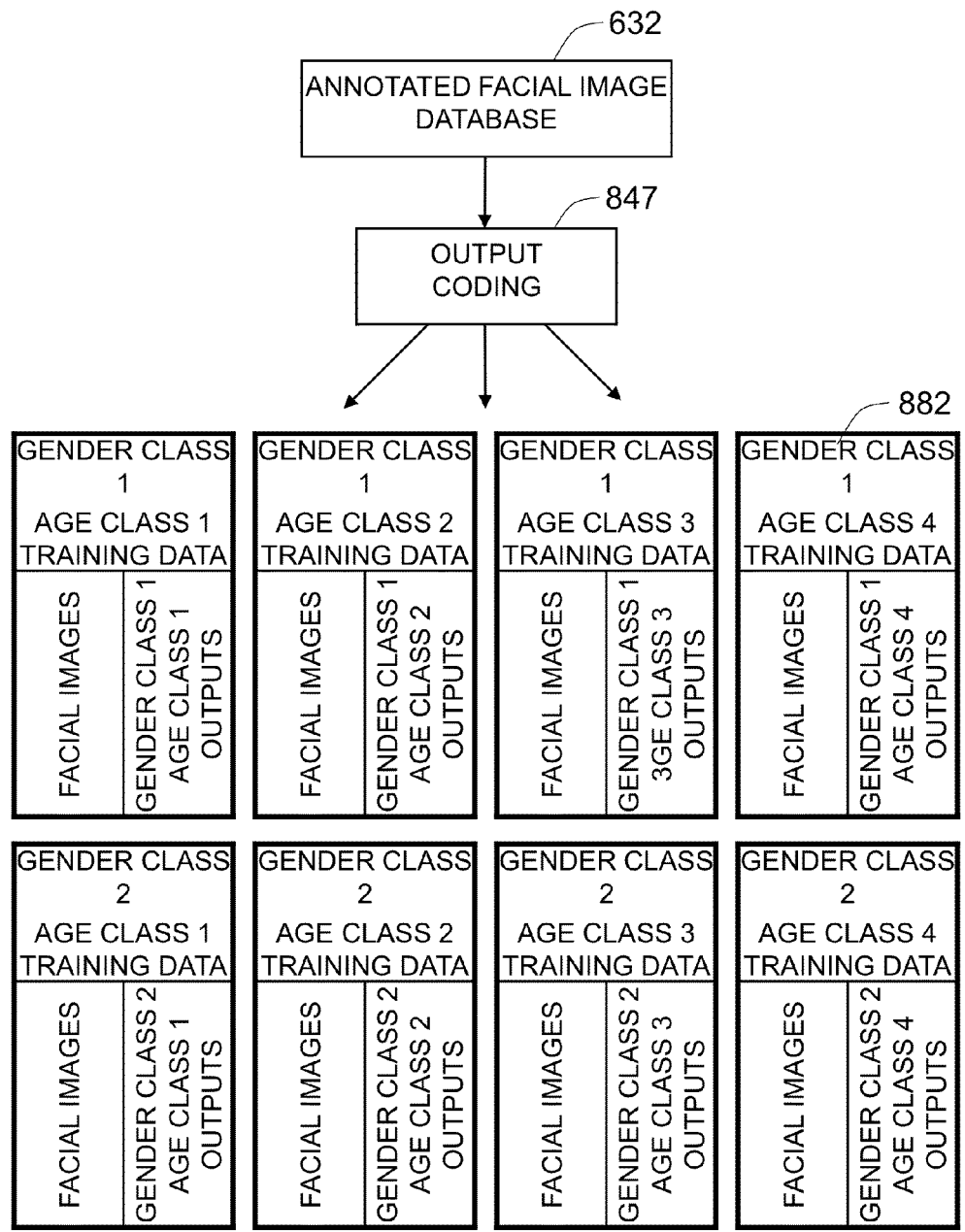
FIG. 8 shows the training data preparation scheme.

FIG. 8 shows the training data preparation scheme in an exemplary embodiment of the present invention. The annotated facial image database 632 is converted to a set of auxiliary class training data 882, where each training data corresponds to one of the auxiliary classes. Each training data consists of facial images and the outputs determined by the output coding 847.

The facial images are common for all of the training data, but the desired outputs depend on the given auxiliary class; each learning machine receives all of the facial images, but is trained to output different quantities determined by the output coding 847 step.

Figure 9:
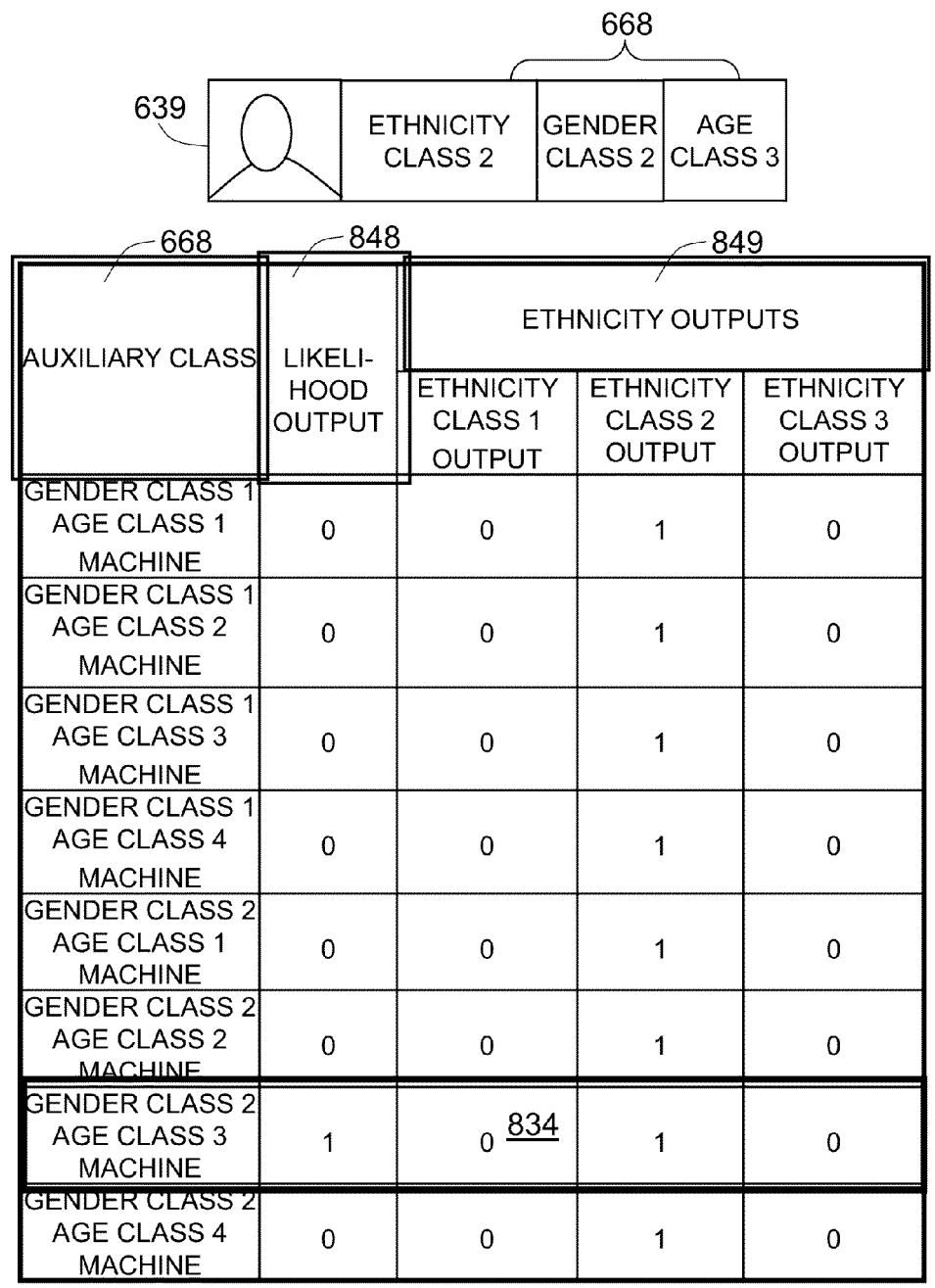
FIG. 9 shows the training scheme for each learning machine.

FIG. 9 shows the output coding 847 scheme for each training data in an exemplary embodiment of the present invention. The outputs are determined for each face in the facial image database, and the outputs consist of the likelihood output and the ethnicity outputs. The likelihood output 648 of a given facial image is 1 when the auxiliary class 668 of the face and the learning machine 831 match; it is 0 otherwise.

For example, only the gender class 2 and age class 3 machine 834 should have response 1 to the given input face 639 of ethnicity class 2, gender class 2, age class 3. The ethnicity outputs 849 match the ethnicity label of the input face 639. In the figure, the ethnicity class 2 output requires the value 1 for the given auxiliary class machine, and 0.5 for all of the other machines, corresponding to the ethnicity of the input face 639, effectively enforcing more accurate finer-level classifier outputs for the instances from the given gross-level class. In the same way, the outputs of all of the annotated facial images are determined.

Figure 10:
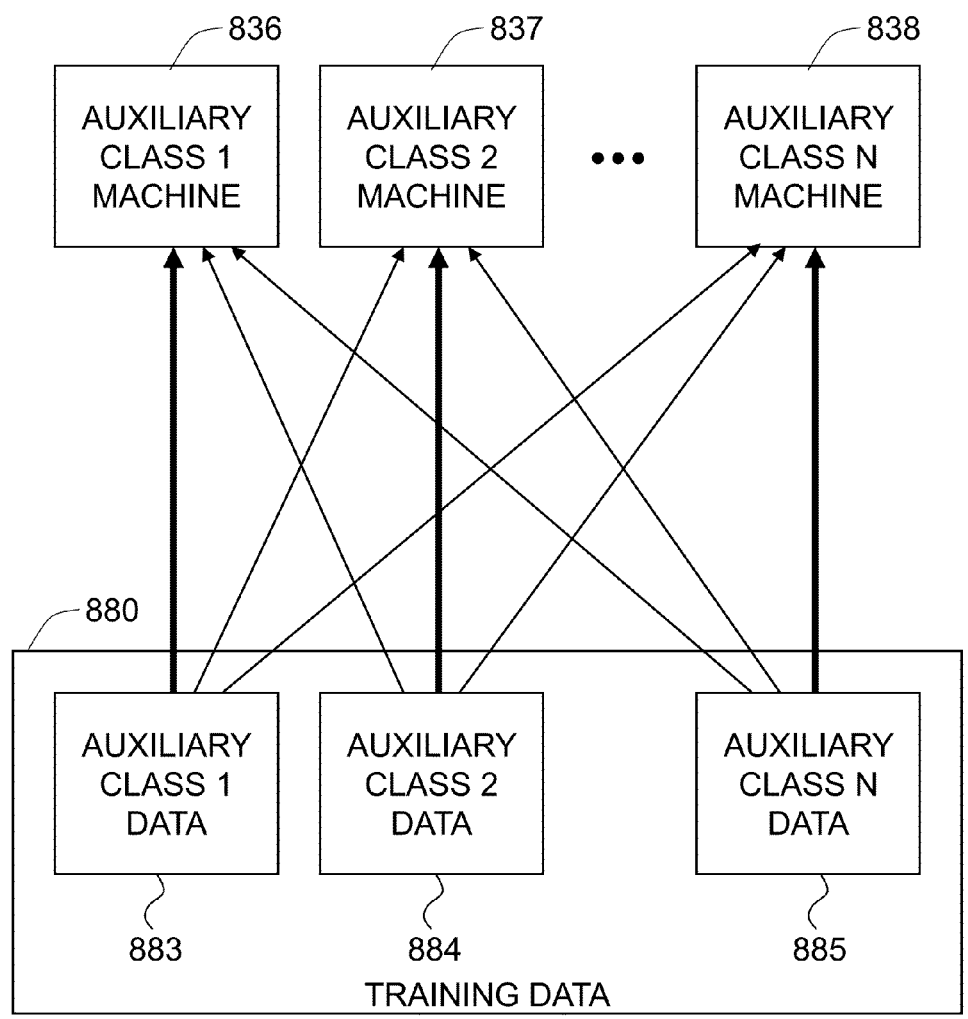
FIG. 10 shows the weighted training scheme.

FIG. 10 shows the weighted training scheme to make each auxiliary class machine specialized to a given auxiliary class. Each auxiliary class machine 835 is specialized, in terms of ethnicity classification, to the corresponding auxiliary class data 882, by assigning more importance to the data from the auxiliary class 882. For example, the auxiliary class 1 machine 836 is specialized to the ethnicity classification for the auxiliary class 1 by assigning more importance to the auxiliary class 1 data 883 and by assigning less importance to the auxiliary class 2 data 884 through the auxiliary class N data 885. In an exemplary embodiment where the learning machine is an artificial neural network, the auxiliary class machine is specialized to the corresponding auxiliary class data by feeding more of the corresponding auxiliary class data and less of the other auxiliary class data in the training cycle.

Figure 11:
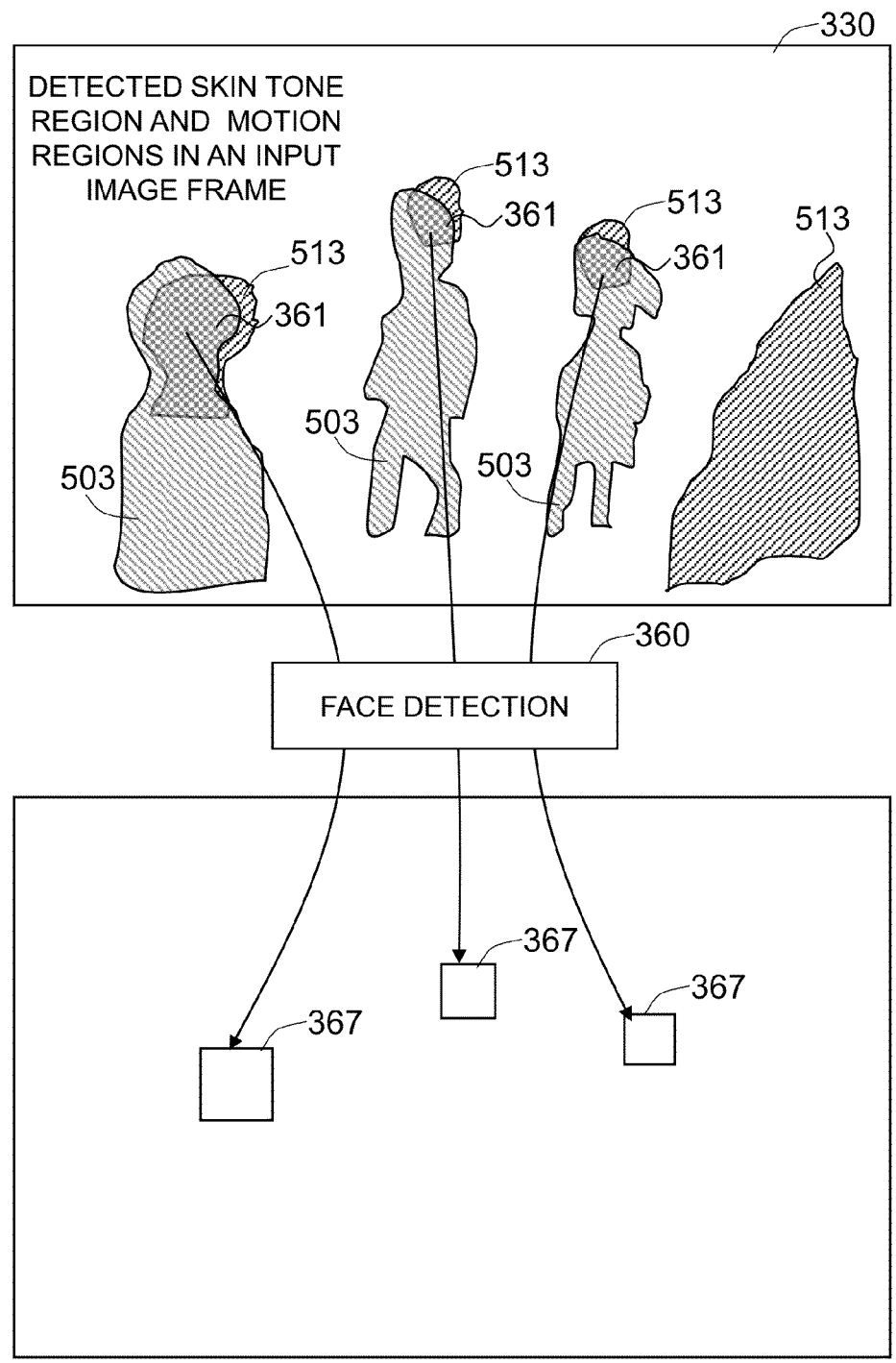
FIG. 11 is a view of the preferred embodiment of the face detection step.

FIG. 11 shows the face detection scheme in an exemplary embodiment of the present invention. Skin tone detection and motion detection are performed in an input image frame 330 to limit the search space for the face detection 360, and at the same time to reduce falsely detected faces. The skin tone detection utilizes color information to find regions in the input image frame where the human faces are likely to be present. The motion detection finds the region in the image frame where any movement takes place. In the exemplary embodiment, the region overlapped by the skin tone region 513 and the motion region 503 is chosen as the face detection region 361. Any image-based face detection 360 algorithm can be used to detect human faces in the face detection region 361. Typically, a machine learning-based face detection algorithm is employed. The face detection algorithm produces face windows 367, where each face window represents the location and the size of the detected face 365.

Figure 12:
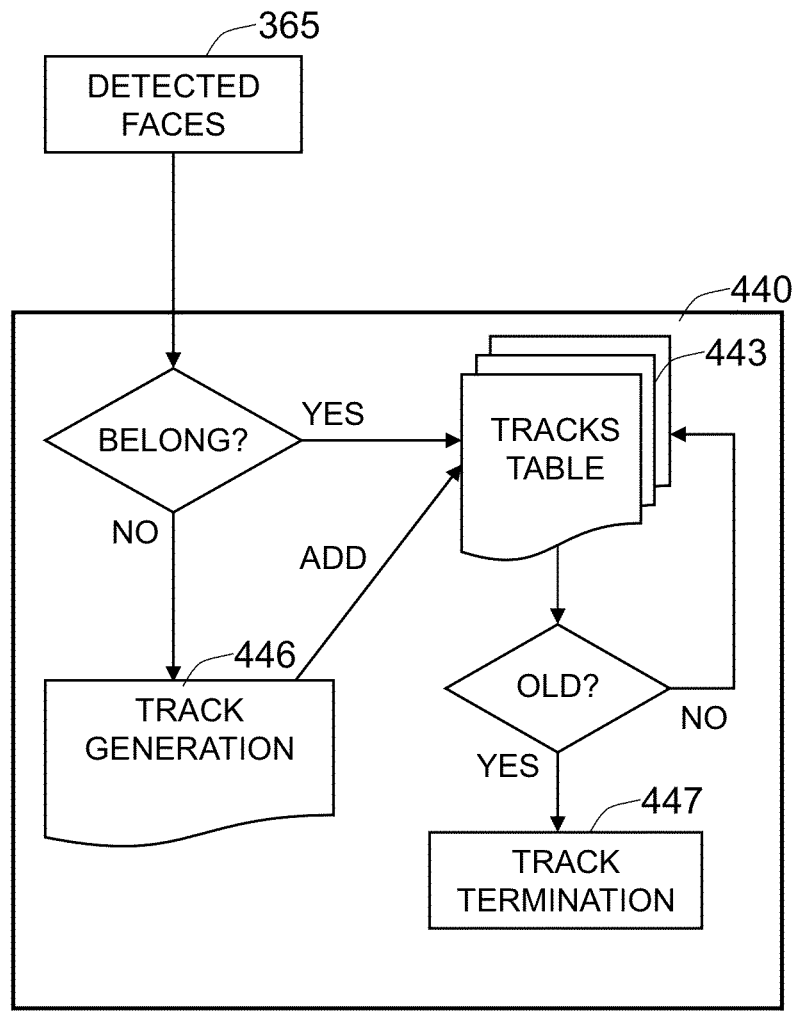
FIG. 12 is an overall view of the face tracking method.

FIG. 12 shows the face tracking 440 in an exemplary embodiment of the present invention. The face tracking 440 is carried out based on the detected faces 365 from the face detection 360 step. The face tracking serves to keep the identities of people for a reliable ethnicity classification. The tacking generates 446 a new track when a new face appears in the scene, assigns detected faces to existing tracks 443 to keep identities of people in the scene, and terminates a track 447 when a person is out of the scene. When new faces are detected in the current video frame, the face tracking constructs a table of the new faces and the existing tracks. Then it computes the match score of each (face, track) pair that measures the likelihood of the given face belonging to the track. The match score can be computed based on the geometric match (based on the difference in position, size, and the time) between the new face and the last face in the track) and the appearance match between the new face and the last face in the track. If the total score is below a predetermined threshold, the pair is excluded from the table. The pair showing the best match (the highest score) is allowed an assignment: face→track. This procedure is repeated until all of the faces are assigned to matching tracks. However, if there is a new person in the scene, the face is not supposed to have a match with one of the existing tracks. In that case, the threshold should have excluded the face, and the face should remain in the queue. The face then generates a new track 446, and the track is added to the tracks table 443.

For every frame, if a certain track does not have a new face for more than a certain time period, the face tracking terminates 447 the track.

Figure 13:
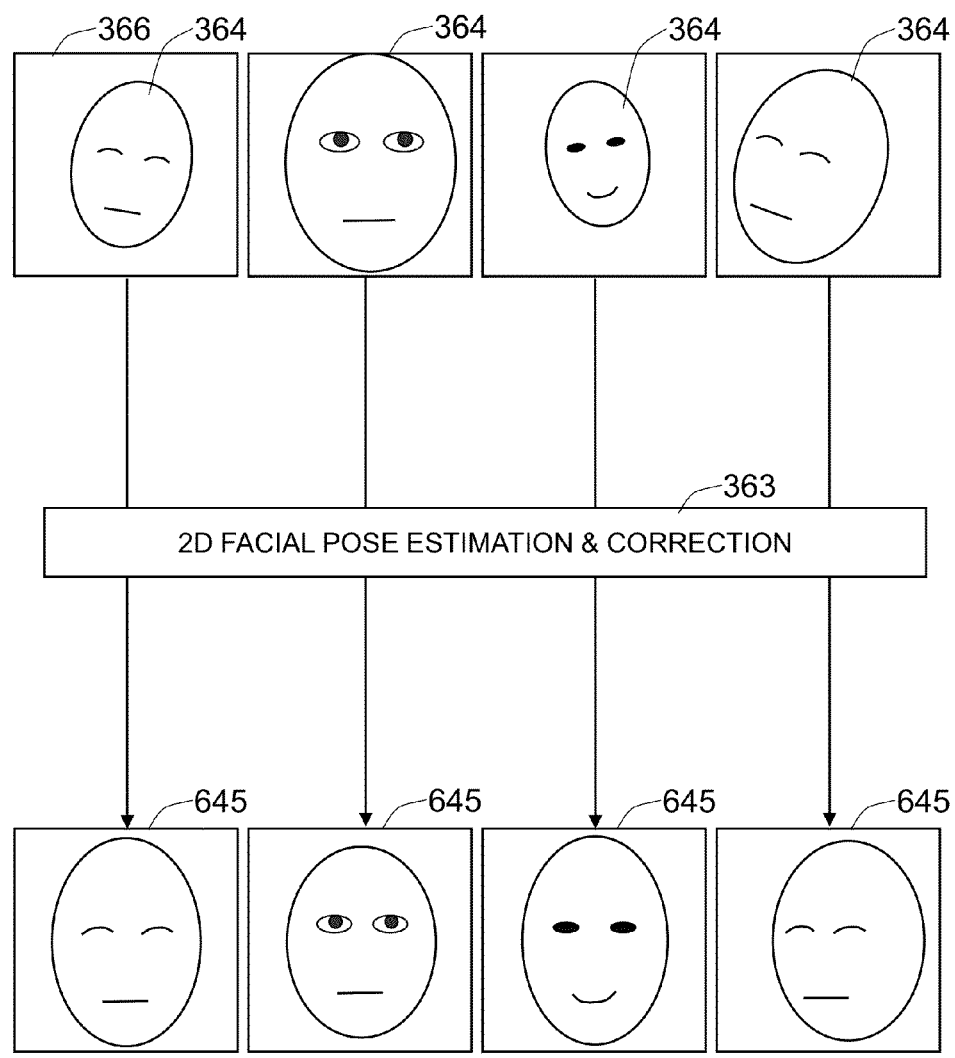
FIG. 13 shows the two-dimensional facial pose estimation & correction step.

FIG. 13 shows the two-dimensional facial pose estimation & correction 363 step for the input faces that do not have out-of-plane rotation. The tracked facial image should be normalized before it is fed to the ethnicity classification 802. In an exemplary embodiment, the facial images are aligned so that the respective facial features (eyes, mouths) match. First, the two-dimensional facial pose is estimated. A detected face 364 has varied position (X, Y) within the face window 366, and also has varied size S and orientation O. In an exemplary embodiment, the two-dimensional pose (X, Y, S, O) is estimated using a learning machine regressor 832. Given the estimated (X, Y, S, O), the detected and tracked facial image is shifted, resized, and rotated so that the positions of the facial features match the standard positions. The two-dimensional corrected facial image 645 is then fed to the ethnicity classification.

Figure 14:
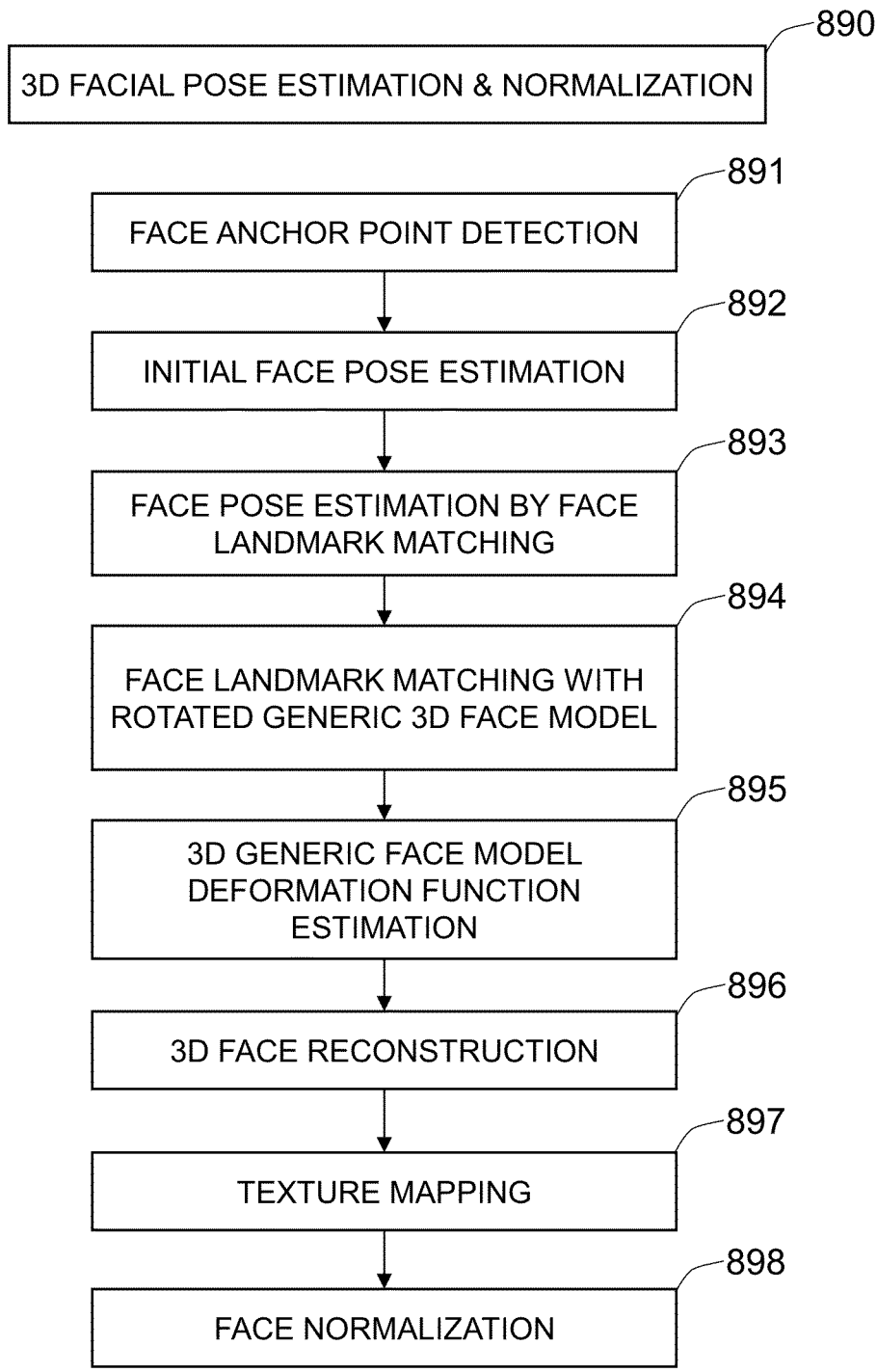
FIG. 14 shows more generic three-dimensional facial pose estimation and normalization step even with the presence of out-of-plane rotations in the input faces.

FIG. 14 shows more generic three-dimensional facial pose estimation and normalization 890 step. In an exemplary embodiment, a set of primitive facial pose descriptors (i.e., anchor points) are detected 891 given an input image. The anchor points may include the center of eyes and the corners of the mouth. A face detection algorithm may localize best ellipses to the faces in the input image, and find the anchor points using a set of appearance-based individual detectors for each anchor point. The relative location of the anchor points within the best ellipses with respect to the center of the ellipses would be used to estimate the initial pose of the face 892 in terms of the orientation and size of the faces. A generic face landmark shape model is then used, which is a mesh model that consists of edges and vertices for face landmark points including the corners of eyes, mouth, noses, and ears. Each vertex of the shape model has its own appearance model for detection. The generic face landmark shape model is scaled, rotated, and translated onto the faces on the input images based on the initially estimated face poses. Given the initial alignment of the face shape model, the best match between the face shape model and the face in an input image is found in such a way that the distance in shape and texture matching in terms of the face landmarks between two faces is minimized. The pose, location, and size of the shape model would then be the best estimate of the face pose parameters 893.

To reconstruct the 3D model of the input face, a generic 3D face mesh model is aligned with the input face using the estimated face pose parameters 894. The transformation function between the corresponding face landmarks in the input face and the generic 3D face model is then estimated 895 using a robust iterative minimization method based on RANSAC and Levenberg-Marquardt minimization approach. Given the transformation function, the deformation between the two sets of face landmarks can be mapped through a Thin Plate Spline-based approach. The obtained mapping function is used to actually deform the generic 3D face model 896 and then to map the textures from the input face to the deformed 3D face model 897. The missing textures in the 3D face model due to occlusions may be recovered based on the fact that face is symmetrical. The reconstructed 3D face model is then normalized 898 in terms of size, position, and rotations so that the exact frontal view can be obtained. In the prior art, the most similar approach to our method would include "Choi, J., Medioni, G., Lin, Y., Silva, L., Regina, O., Pamplona, M., & Faltemier, T. C. (2010, August). 3d face reconstruction using a single or multiple views. In Pattern Recognition (ICPR), 2010 20th International Conference on (pp. 3959-3962). IEEE."

Although the process described is for a single input image, the deformation function between the generic 3D face model and the input face can be learned from multiple faces of the same person in different views. The texture can also be aggregated from the multi-view faces of the same person.

In sum, (1) we can normalize the face images even in the presence of out-of-plane rotations and (2) such face normalization can benefit from multiple views of the face of the same shopper (captured in a period of time) by improving the accuracy of the face model deformation and mapping function between the input face and a generic 3D face model and also by incorporating the textures of the face of the same shopper in multiple light conditions present in the multiple views.

Figure 15:
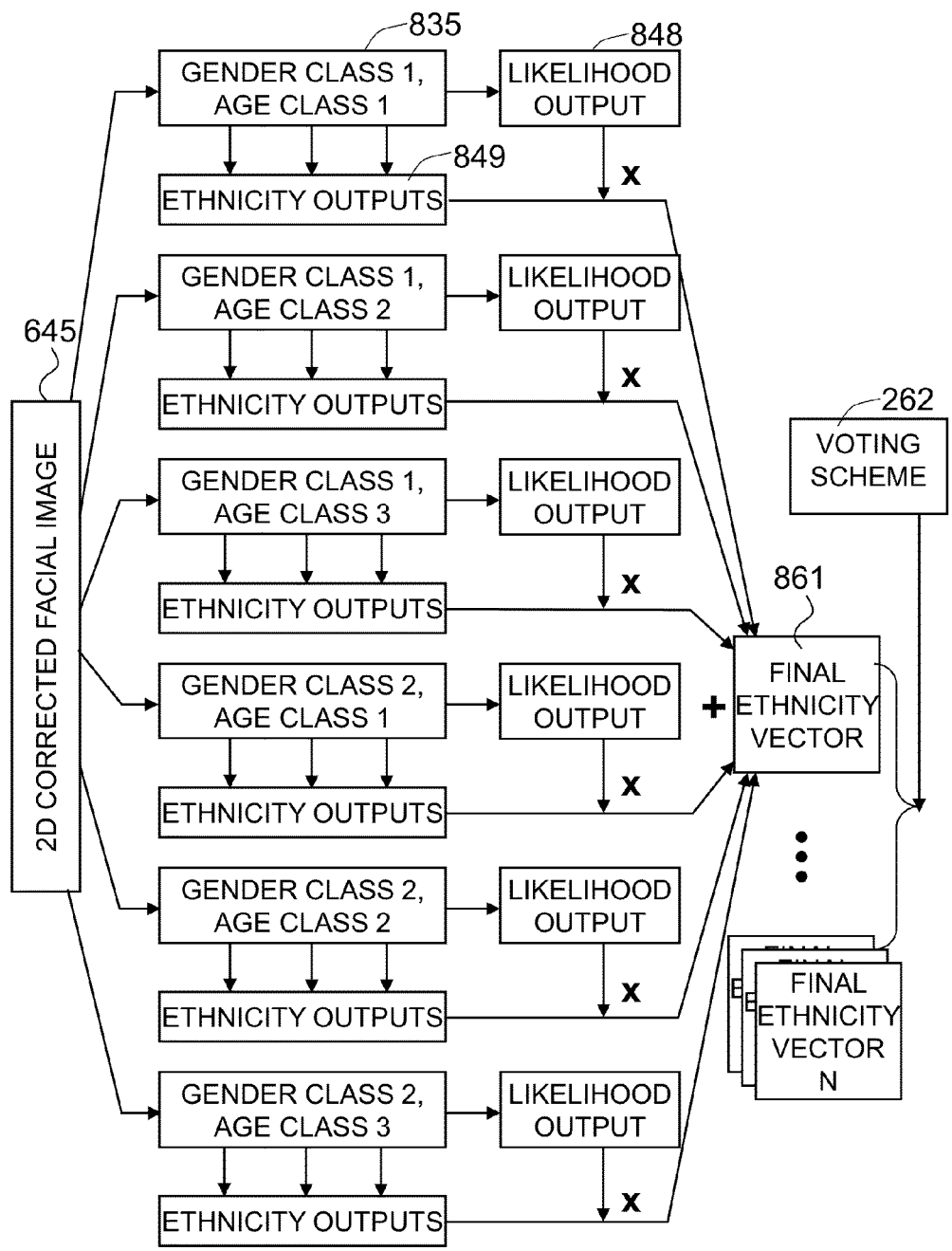
FIG. 15 shows the step of the aggregation of the responses from all of the learning machines for the final ethnicity classification.

FIG. 15 shows the step of ethnicity classification 802; the output responses from all of the learning machines are integrated to determine the ethnicity. The two-dimensional corrected facial image is fed to the plurality of the auxiliary class machine 835. Each auxiliary class machine 835 computes two outputs: 1) the likelihood output 848 of the given input image belonging to the auxiliary class, and 2) the ethnicity output 849.

In an exemplary embodiment of the present invention, the set of ethnicity outputs is treated as a vector: for example, ("ethnicity class 1" output, "ethnicity class 2" output, "ethnicity class 3" output). The ethnicity output vectors are weighted by the auxiliary class likelihood output 848, and are added together to compute the final ethnicity vector 861: ("ethnicity class 1" sum, "ethnicity class 2" sum, "ethnicity class 3" sum). The final decision chooses the ethnicity label that has the highest score. For example, if "ethnicity class 2" score>"ethnicity class 1" score and "ethnicity class 2" score>"ethnicity class 3" score, then "ethnicity class 2" is chosen as the ethnicity of the input facial image.

A voting scheme 262 can be applied to help in the final decision process. For example, a voting scheme is applied to a series of multiple classification instances, i.e. producing a series of multiple final ethnicity vectors 1 through N, that are estimated by the learning machines for multiple input facial images of the same person rather than selecting the ethnicity label that has the highest score from a single instance of a ethnicity vector for an input facial image. If a specific ethnicity label gets majority of the votes after each comparison among the ethnicity labels in each vector, the specific ethnicity label is chosen as the ethnicity of the input facial image.

Figure 16:
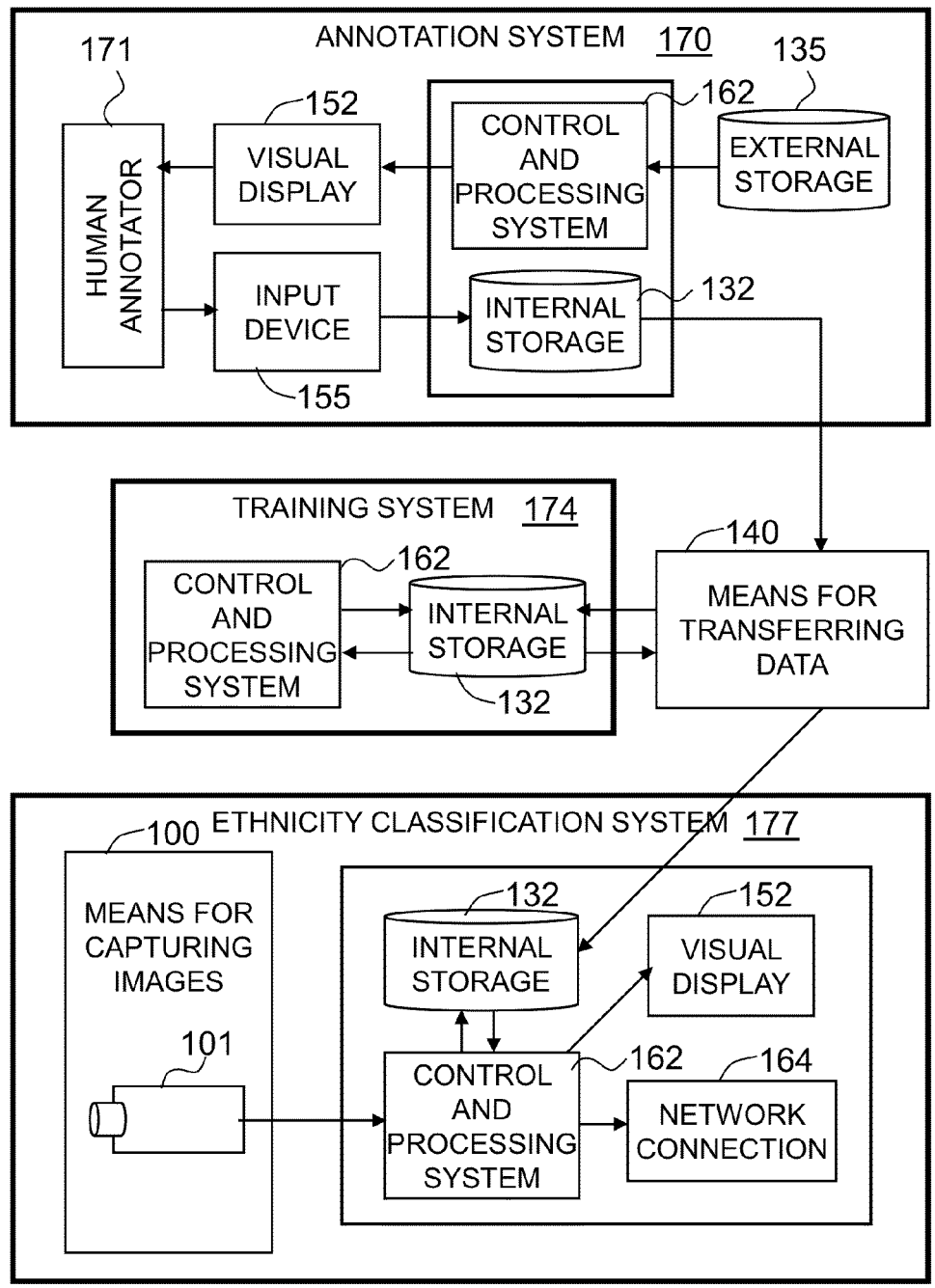
FIG. 16 shows exemplary hardware components in an exemplary embodiment of the present invention.

FIG. 16 shows exemplary hardware components in an exemplary embodiment of the present invention. The present invention is an apparatus for determining ethnicity class based on facial images. The apparatus comprises means for acquiring input image frames, means for detecting and tracking faces from the input image frames, means for extracting image features of said faces in a way that the faces have standard position, size, and orientation, and means for processing said image feature using multi-classifier architecture utilizing information about demographic classes of the faces other than ethnicity, called auxiliary classes, to determine the ethnicity classes of the faces.

The hardware components consist of three subsystems: the annotation system 170, the training system 174, and the ethnicity classification system 177.

In an exemplary embodiment of the present invention, the annotation system 170 comprises a human annotator 171, an external storage 135 with a facial image database and a computer system that consists of a visual display 152, an input device 155, a control and processing system 162, and an internal storage 132. The external storage 135 can comprise a storage computer server, or an external hard disk. The visual display 152 can comprise a CRT or an LCD monitor. The input device 155 can comprise a keyboard and a mouse. In an exemplary embodiment, a PC having 1 GB memory can serve as a control and processing system 162. A hard disk drive can serve as the internal storage 132. The control and processing system 162 samples and fetches a pair of facial images from the external storage 135, and displays it to the visual display 152. The human annotator 171 then annotates the pair of facial images based on the displayed images, and records the annotated training data to the internal storage 132 using the input device 155.

In an exemplary embodiment of the present invention, the training system 174 comprises a generic personal computer having a control and processing system 162 and an internal storage 132. A PC having 1 GB memory can serve as a control and processing system 162. A hard disk drive can serve as the internal storage 132. The annotated training data from the annotation system 170 can be transferred to the internal storage 132 of the training system 174 using means for transferring data 140. The means for transferring data 140 can comprise a direct cable connection, or a network connection. The control and processing system then applies the training algorithm to generate the trained learning machines.

In an exemplary embodiment of the present invention, the ethnicity classification system 177 comprises means for capturing images 100 and a computer system having a control and processing system 162, and an internal storage 132. The trained learning machines can be transferred to the internal storage 132 of the age estimation system 177 using means for transferring data 140. In the exemplary embodiment, a plurality of means for capturing images 100 is connected to the control and processing system 162. The control and processing system takes digitized video data from the means for capturing images 100. The control and processing system 162 then processes the digitized facial images using the trained learning machines to classify the ethnicity of the facial image. The classified ethnicity can be stored in the internal storage 132, or can be displayed to the visual display 152, or can be transmitted remotely using the network connection 164.

The means for capturing images 100 can comprise an analog camera, USB camera, or Firewire camera. The means for video interface 105, which can comprise a video frame grabber, USB interface, or Firewire interface, are typically included in the same enclosure as the control and processing system 162. The control and processing system 162 can be a general-purpose personal computer, such as a Pentium 4 PC, or a dedicated hardware that can carry out the required computation.

While the above description contains much specificity, these should not be construed as limitations on the scope of the invention, but as exemplifications of the presently preferred embodiments thereof. Many other ramifications and variations are possible within the teachings of the invention. Thus, the scope of the invention should be determined by the appended claims and their legal equivalents, and not by the examples given.

What is claimed is:

1. A method for determining ethnicity class based on facial images, comprising the following steps of:
  a) setting up multi-classifier architecture,
    wherein each classifier in the multi-classifier architecture, called an auxiliary class machine, is tuned to a specific auxiliary class and is specialized to classify ethnicity within the specific auxiliary class,
  b) training auxiliary class machines so that a first output of an auxiliary class machine is a likelihood of a given facial image belonging to an auxiliary class and a second output of the auxiliary class machine is a set of likelihoods of the given facial image belonging to respective ethnicity classes,
  c) extracting image features of faces detected from an input image frame in a way that the faces have standard position, size, and orientation,
  d) processing the image features using the multi-classifier architecture utilizing information about demographic classes of the faces other than ethnicity, called auxiliary classes, to determine the ethnicity classes of the faces, e) aggregating first outputs and second outputs from the auxiliary class machines for the faces, f) computing ethnicity scores of ethnicity classes by weighting ethnicity outputs from the auxiliary class machines by auxiliary class likelihood outputs from the auxiliary class machines, wherein the first output is auxiliary class likelihood output and the second output is ethnicity output, and (g) applying a voting scheme to a series of multiple classification instances, producing a series of final ethnicity vectors for multiple input facial images of a person, wherein each ethnicity label that has the highest score from each of the series of final ethnicity vectors gets one vote that is contributed toward a final decision for determining ethnicity class.

2. The method according to claim 1, wherein the method further comprises a step of training the auxiliary class machines so that each auxiliary class machine is specialized to a given auxiliary class by assigning higher weights to the training data from the given auxiliary class than weights to the training data from all other auxiliary classes, wherein values for the weights are predefined for training the auxiliary class machines.

3. The method according to claim 2, wherein the method further comprises a step of feeding a first set of training data from the given auxiliary class and a second set of training data from all other auxiliary classes to a learning machine, wherein the first set of training data has a larger number of elements than the second set of training data, wherein the learning machine is an artificial neural network.

4. The method according to claim 1, wherein the method further comprises a step of arranging a plurality of classifiers in serial, wherein the arrangement includes any sequential ordering of the plurality of classifiers specialized to one or more of ethnicity classes or auxiliary classes.

5. The method according to claim 1, wherein the method further comprises a step of arranging a plurality of classifiers in parallel, wherein each classifier is specialized to an ethnicity class delimited by an ethnicity class and an auxiliary class, and wherein a final decision is made based on all responses from the plurality of classifiers at a classifier fusion step.

6. The method according to claim 1, wherein the method further comprises a step of estimating a deformation function based on correspondence between a set of face landmarks between an input face and an aligned 3D face model.

7. The method according to claim 1, wherein the method further comprises a step of applying a mapping function to deform a 3D face model and to map textures from an input face to the deformed 3D face model, wherein the deformed 3D face model is normalized in terms of size, position, and rotation so that an exact frontal view of the input face is obtained.

8. An apparatus for determining ethnicity class based on captured facial images using computer vision technologies, comprising:

a) auxiliary class machines wherein a first output of an auxiliary class machine is a likelihood of a given facial image belonging to an auxiliary class and a second output of the auxiliary class machine is a set of likelihoods of the given facial image belonging to respective ethnicity classes, wherein each auxiliary class machine is tuned to a specific auxiliary class and is specialized to classify ethnicity within the specific auxiliary class, b) a computer that performs the following steps of:

extracting image features of faces detected from an input image frame in a way that the faces have standard position, size, and orientation, processing the image features using multi-classifier architecture utilizing information about demographic classes of the faces other than ethnicity, called auxiliary classes, to determine the ethnicity classes of the faces, aggregating first outputs and second outputs from the auxiliary class machines for the faces, computing ethnicity scores of ethnicity classes by weighting ethnicity outputs from the auxiliary class machines by auxiliary class likelihood outputs from the auxiliary class machines, wherein the first output is auxiliary class likelihood output and the second output is ethnicity output, and applying a voting scheme to a series of multiple classification instances, producing a series of final ethnicity vectors for multiple input facial images of a person, wherein each ethnicity label that has the highest score from each of the series of final ethnicity vectors gets one vote that is contributed toward a final decision for determining ethnicity class.

9. The apparatus according to claim 8, wherein the apparatus further comprises a computer for training the auxiliary class machines so that each auxiliary class machine is specialized to a given auxiliary class by assigning higher weights to the training data from the given auxiliary class than weights to the training data from all other auxiliary classes, wherein values for the weights are predefined for training the auxiliary class machines.

10. The apparatus according to claim 9, wherein the apparatus further comprises a computer for feeding a first set of training data from the given auxiliary class and a second set of training data from all other auxiliary classes to a learning machine, wherein the first set of training data has a larger number of elements than the second set of training data, wherein the learning machine is an artificial neural network.

11. The apparatus according to claim 8, wherein the apparatus further comprises a computer for arranging a plurality of classifiers in serial, wherein the arrangement includes any sequential ordering of the plurality of classifiers specialized to one or more of ethnicity classes or auxiliary classes.

12. The apparatus according to claim 8, wherein the apparatus further comprises a computer for arranging a plurality of classifiers in parallel, wherein each classifier is specialized to an ethnicity class delimited by an ethnicity class and an auxiliary class, and wherein a final decision is made based on all responses from the plurality of classifiers at a classifier fusion step.

13. The apparatus according to claim 8, wherein the apparatus further comprises a computer for estimating a deformation function based on correspondence between a set of face landmarks between an input face and an aligned 3D face model.

14. The apparatus according to claim 8, wherein the apparatus further comprises a computer for applying a mapping function to deform a 3D face model and to map textures from an input face to the deformed 3D face model, wherein the deformed 3D face model is normalized in terms of size, position, and rotation so that an exact frontal view of the input face is obtained.

* * * * *